(12) United States Patent
Sakai et al.

(10) Patent No.: US 8,278,859 B2
(45) Date of Patent: Oct. 2, 2012

(54) ELECTRIC MOTOR DRIVE DEVICE, CONTROL METHOD OF ELECTRIC MOTOR DRIVE DEVICE, AND ELECTRICALLY DRIVEN DEVICE

(75) Inventors: Koji Sakai, Kariya (JP); Akitomo Yamanaka, Okazaki (JP)

(73) Assignee: DENSO CORPORATION, Kariya (JP)

( * ) Notice: Subject to any disclaimer, the term of this patent is extended or adjusted under 35 U.S.C. 154(b) by 273 days.

(21) Appl. No.: 12/836,927

(22) Filed: Jul. 15, 2010

(65) Prior Publication Data
US 2011/0031922 A1 Feb. 10, 2011

(30) Foreign Application Priority Data
Aug. 6, 2009 (JP) .................................. 2009-183363

(51) Int. Cl.
*H02P 6/00* (2006.01)
(52) U.S. Cl. .................... 318/400.32; 318/727
(58) Field of Classification Search .................. 318/459, 318/500, 400.32, 400.33, 727; 388/928.1
See application file for complete search history.

(56) References Cited

U.S. PATENT DOCUMENTS

| 5,029,263 A * | 7/1991 | Rozman ........................ 318/714 |
| 6,320,775 B1 | 11/2001 | Ito et al. |
| 7,088,595 B2 * | 8/2006 | Nino ................................. 363/17 |
| 2003/0146726 A1 | 8/2003 | Ishikawa et al. |
| 2007/0063661 A1 * | 3/2007 | Galli et al. ..................... 318/109 |
| 2007/0120520 A1 | 5/2007 | Miyazaki et al. |
| 2007/0278986 A1 * | 12/2007 | Okamura ....................... 318/798 |
| 2009/0237013 A1 | 9/2009 | Sato |

FOREIGN PATENT DOCUMENTS

| JP | A-05-207664 | 8/1993 |
| JP | A-05-207782 | 8/1993 |
| JP | A-09-056197 | 2/1997 |
| JP | A-09-233709 | 9/1997 |
| JP | A-2006-311768 | 11/2006 |

* cited by examiner

*Primary Examiner* — Rina Duda
(74) *Attorney, Agent, or Firm* — Posz Law Group, PLC (57) ABSTRACT

An electric motor drive device has an inverter adjusting the voltage applied to an AC electric motor so as to drive the AC electric motor, a capacitor which is charged by a current supplied from a DC power supply supplying DC voltage between a neutral point at which a plurality of coils of the AC electric motor are connected and a positive rail or negative rail of an inverter and passing through the inverter, and a control circuit controlling the inverter so that the AC electric motor turns at a designated speed. Further, the control circuit selectively uses field weakening control and voltage boosting control for control of the inverter according to the conditions of the induced voltage generated at the AC electric motor, DC power supply, and voltage of the capacitor.

8 Claims, 7 Drawing Sheets

ELECTRIC MOTOR DRIVE DEVICE, CONTROL METHOD OF ELECTRIC MOTOR DRIVE DEVICE, AND ELECTRICALLY DRIVEN DEVICE

CROSS-REFERENCE TO RELATED APPLICATION

The applicant claims the right to priority based on Japanese Patent Application No. 2009-183363, filed on Aug. 6, 2009. The entire content of Japanese Patent Application No. 2009-183363 is hereby incorporated by reference.

TECHNICAL FIELD

The present invention relates to an electric motor drive device controlling an electric motor driven by multi-phase AC electric power, a control method of an electric motor drive device, and an electrically driven device in which such an electric motor drive device is assembled.

BACKGROUND ART

In the past, the art has been developed of using an inverter to convert DC electric power to three-phase AC electric power and using that three-phase AC electric power to drive an AC electric motor. As one example of the drive method of an electric motor using this art, "field weakening control" weakening the magnetic field which a field system generates so as to lower the induced voltage generated in an electric motor at the time of high speed operation is known. Further, as another drive method, "voltage boosting control" charging and discharging a capacitor connected between a positive rail and negative rail of an inverter, that is, making the voltage between the positive rail and negative rail of the inverter fluctuate, is known. Further, to improve the energy conversion efficiency of an electric motor, the art of switching between these two control methods has been proposed (for example, see Japanese Unexamined Patent Publication (Kokai) No. 2007-159368 and Japanese Unexamined Patent Publication (Kokai) No. 2006-311768).

In the art disclosed in Unexamined Patent Publication (Kokai) No. 2007-159368 and Japanese Unexamined Patent Publication (Kokai) No. 2006-311768, a circuit part for charging the capacitor becomes necessary separate from the circuit part for driving the electric motor. For this reason, the number of parts included in the circuit becomes greater, so this is not preferred. As opposed to this, the art of connecting a power supply between a neutral point of an electric motor and a negative rail of an inverter and utilizing the current flowing through the electric motor and inverter when the electric motor is operating so as to convert the electric power and thereby eliminating the need for a boosting circuit has been proposed (for example, see Japanese Unexamined Patent Publication (Kokai) No. 10-337047).

SUMMARY OF THE INVENTION

However, in the art disclosed in Japanese Unexamined Patent Publication (Kokai) No. 10-337047, the same switch circuit is used for voltage boosting control and electric motor drive control, so depending on the drive conditions of the electric motor, the energy conversion efficiency was liable to end up failing.

As one aspect of the present invention, there is provided an electric motor drive device which drives an AC electric motor including a plurality of coils connected in a star configuration. Such an electric motor drive device includes an inverter including a plurality of arms, each of the plurality of arms corresponding to any one of the plurality of coils of the AC electric motor and including a first switching device connected to a positive rail and a second switching device connected in series between the first switching devices and a negative rail, wherein, for each of the plurality of arms, the midpoint of the first switching device and second switching device is connected with one end of the corresponding coil of the AC electric motor; a capacitor charged by a current supplied from a DC power supply supplying DC voltage between a neutral point to which the coils of the AC electric motor are connected and a positive rail or negative rail of the inverter and passing through the inverter; and a control circuit controlling the switching devices of the inverter so that the AC electric motor rotates at a designated speed. Further, the control circuit uses field weakening control, which lowers the induced voltage to control the switching devices of the inverter, when the induced voltage generated at the AC electric motor is larger than the power supply voltage supplied by the DC power supply and, on the other hand, uses voltage boosting control, which changes the amount of charging of the capacitor so as to change the voltage applied to the AC electric motor to control the switching devices of the inverter, when the induced voltage is smaller than the power supply voltage. Due to this configuration, this electric motor drive device can reduce in the number of parts while improving the energy conversion efficiency.

Further, preferably the control circuit uses predetermined control among the field weakening control and the voltage boosting control so as to control the switching devices of the inverter when a difference of the power supply voltage and the induced voltage is within a predetermined range. When the difference between the power supply voltage and the induced voltage is small, the higher energy conversion efficiency control among the field weakening control and voltage boosting control is determined by the assembly error of the AC electric motor and other factors. Therefore, by investigating which control among field weakening control and voltage boosting control will give a higher energy conversion efficiency when the difference between the power supply voltage and the induced voltage is within a predetermined range, this electric motor drive device can suitably select the control giving the higher energy conversion efficiency.

Further, preferably the electric motor drive device further includes an ammeter which measures the current flowing through the AC electric motor, and, when the difference between the power supply voltage and the induced voltage is within a predetermined range, the control circuit uses field weakening control to control the switching devices of the inverter in the case where the value of the current is higher than a predetermined value and uses voltage boosting control the switching devices of the inverter in the case where the value of the current is that predetermined value or less. Due to this, this electric motor drive device can select the control method based on the results of measurement of the current actually flowing through the AC electric motor, so it is possible to select a higher efficiency control method in real time.

Furthermore, preferably the control circuit uses field weakening control to control the switching devices of the inverter when the induced voltage is smaller than the power supply voltage and the total of the power supply voltage and induced voltage is lower than the voltage across the terminals of the capacitor. Due to this, this electric motor drive device selects field weakening control when the amount of charging of the capacitor just increases even when raising the voltage supplied to the AC electric motor, so can improve the energy conversion efficiency more.

Furthermore, preferably the control circuit estimates the power supply voltage by dividing the voltage across the terminals of the capacitor by a ratio of a time period during which current flows from the inverter to the capacitor in one period of switching signals for control of the switching devices of the inverter. Due to this, this electric motor drive device need not be provided with a sensor for measuring the power supply voltage. Note that, the control circuit may also multiply the ratio of the time period during which current flows from the inverter to the capacitor in one period of the switching signals to the power supply voltage so as to estimate the voltage across the terminals of the capacitor.

Furthermore, preferably the electric motor drive device further includes a status signal acquiring unit which acquires a status signal expressing a state of the operating environment of the electric motor drive device, and wherein the control circuit uses values corresponding to the status signal and designated speed among the values giving a predetermined indicator of induced voltage for a combination of the status signal and speed so as to estimate the induced voltage. Due to this, this electric motor drive device can accurately estimate the induced voltage even when the operating environment of the AC electric motor changes.

Furthermore, as another aspect of the present invention, there is provided a control method of an electric motor drive device for driving an AC electric motor which includes a plurality of coils connected in a star configuration. The electric motor drive device to which this control method is applied includes an inverter including a plurality of arms, each of the plurality of arms corresponding to any one of the plurality of coils of the AC electric motor and including a first switching device connected to a positive rail and a second switching device connected in series between the first switching devices and a negative rail, wherein, for each of the plurality of arms, the midpoint of the first switching device and second switching device is connected with one end of the corresponding coil of the AC electric motor, and a capacitor charged by a current supplied from a DC power supply supplying DC voltage between a neutral point to which the other ends of the coils of the AC electric motor are connected and a positive rail or negative rail of the inverter and passing through the inverter. Further, this control method includes comparing the induced voltage generated at the AC electric motor with the power supply voltage supplied by the DC power supply and using field weakening control, which lowers the induced voltage to control the switching devices of the inverter so that the AC electric motor rotates at a designated speed, when the induced voltage generated at the AC electric motor is larger than the power supply voltage supplied by the DC power supply and, on the other hand, using voltage boosting control, which changes the amount of charging of the capacitor so as to change the voltage applied to the AC electric motor to control the switching devices of the inverter, when the induced voltage is smaller than the power supply voltage. By including such a routine, this method of driving an electric motor can reduce the number of parts while improving the energy conversion efficiency.

Furthermore, as another aspect of the present invention, an electrically driven device is provided. This electrically driven device includes an AC electric motor in which a plurality of coils are connected in a star configuration, any one of the above electric motor drive devices for controlling the AC electric motor, and an operating unit performing predetermined work using power supplied from the AC electric motor.

BRIEF DESCRIPTION OF THE DRAWINGS

The features of the present invention shown here and other features and advantages will be better understood by reference to the following drawings and detailed description.

DESCRIPTION OF EMBODIMENTS

Below, referring to the drawings, embodiments of the present invention will be explained. However, the scope of the present invention is not limited to the following explanation and extends to equivalents of the aspects of the invention described in the claims, it should be noted.

Below, an electric motor drive device according to a first embodiment of the present invention will be explained. This electric motor drive device drives an AC electric motor having a plurality of coils. The coils are provided at a rotor or stator for giving a drive force to the rotor and generate a rotating magnetic field by the flow of the different phases of current of the three-phase AC. Further, this electric motor drive device uses the results of comparison of a DC voltage supplied between a neutral point where the plurality of coils are connected in a star configuration and a positive rail or negative rail of the inverter and an induced voltage generated at the AC electric motor as the basis to select either field weakening control for reducing the induced voltage or voltage boosting control. Here, control which increases the current flowing in a direction giving rise to an effect similar to weakening the magnetic field generated by the field system and therefore equivalent to field weakening control is also referred to as "field weakening control" for convenience sake. Note that, in the present embodiment, the AC electric motor driven by the electric motor drive device is a three-phase synchronous electric motor. However, in another embodiment, the AC electric motor driven by the electric motor drive device may also be a three-phase induction electric motor. Further, in another embodiment, the AC electric motor driven by the electric motor drive device may also be a multi-phase synchronous electric motor or multi-phase induction electric motor other than a three-phase one.

Figure 1:
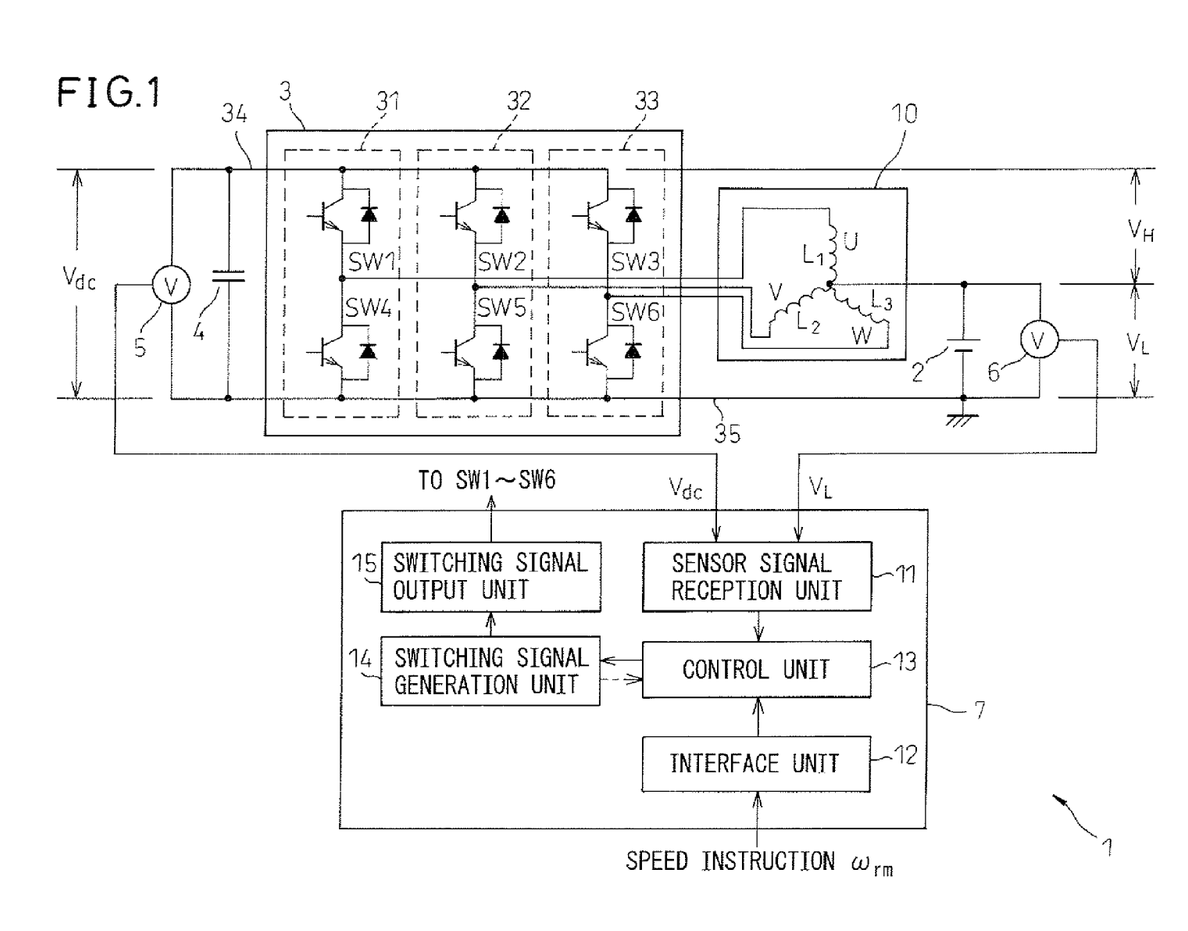
FIG. 1 is a schematic view of the configuration of an electric motor drive device according to a first embodiment of the present invention.

FIG. 1 is a schematic view of the configuration depicting the overall configuration of an electric motor drive device 1 according to a first embodiment of the present invention. The electric motor drive device 1 has an inverter 3, a capacitor 4, voltmeters 5, 6, and a control circuit 7 for driving an electric motor 10.

Further, to supply the DC electric power for driving the electric motor 10, the electric motor 10 is connected to a DC power supply 2. Specifically, an anode of the DC power supply 2 is connected to a neutral point of the electric motor 10 at which the different phases of coils $L_1$ to $L_3$ provided at the stator are connected in a star configuration, while the cathode of the DC power supply 2 is connected to the negative rail 35 of the inverter 3 and grounded. Note that, as the DC power supply 2, various power supplies supplying DC electric power may be utilized. For example, as the DC power supply 2, a lead storage battery, lithium ion battery, or nickel-hydrogen battery may be used.

The inverter 3 converts DC electric power supplied from the DC power supply 2 and input through the electric motor 10 to three-phase AC electric power in accordance with a control signal input from the control circuit 7. For that reason, the inverter 3 has three sets of arms 31, 32, and 33 corresponding to the U-phase, V-phase, and W-phase of the electric motor 10. These arms 31, 32, and 33 are connected in parallel. Further, the arm 31 has series connected switching devices SW1 and SW4. Similarly, the arms 32 and 33 respectively have series connected switching devices SW2 and SW5 and switching devices SW3 and SW6. Note that, here, for convenience, the switching devices SW1 to SW3 are called the "top switching devices", while the switching devices SW4 to SW6 are called the "bottom switching devices".

The switching devices SW1 to SW6, for example, have transistors and diodes connected in parallel to the transistors so that current flows in the opposite direction to the direction of flow of current through the transistors (for example, the emitter terminals of the NPN type transistors and the anode terminals of the diodes are connected and the collector terminals of the transistors and the cathode terminals of the diodes are connected). Note that, as the transistors of the switching devices, for example, insulated gate bipolar transistors (IGBT) or power MOSFETs (metal oxide semiconductor field effect transistors) can be utilized. Note that, the switching devices SW1 to SW6 may also have another configuration enabling switching on/off in accordance with the rotational speed of the electric motor 10.

Further, for the arm 31, one end of the switching device SW1 (cathode terminal side of diode) is connected with the positive rail 34 of the inverter 3. On the other hand, the other end of the switching device SW1, that is, the midpoint of the switching devices SW1 and SW4, is connected with the U-phase terminal of the electric motor 10. Further, one end of the switching device SW4 (anode terminal side of diode) is connected with the negative rail 35 of the inverter 3. Similarly, for the arm 32, one end of the switching device SW2 is connected to the positive rail 34 of the inverter 3. On the other hand, the midpoint of the switching devices SW2 and SW5 is connected to the V-phase terminal of the electric motor 10. Further, one end of the switching device SW5 is connected to the negative rail 35 of the inverter 3. Furthermore, for the arm 33, one end of the switching device SW3 is connected with the positive rail 34 of the inverter 3. On the other hand, the midpoint of the switching devices SW3 and SW6 is connected to the W-phase terminal of the electric motor 10. Further, one end of the switching device SW6 is connected to the negative rail 35 of the inverter.

Further, the switching devices SW1 to SW6 are switched on or off by a control signal from the control circuit 7. Further, for example, by the top switching device of any one arm and the bottom switching devices of the other arms turning on and the other switching devices turning off, current flows to the electric motor 10 and therefore the electric motor 10 turns. Further, by successively changing the on switching devices for the arms, the electric motor 10 stably turns by a designated speed.

The capacitor 4 uses the current flowing to the electric motor 10 to boost the voltage between the positive rail 34 and the negative rail 35 and drive the electric motor. For that purpose, the capacitor 4 is charged or discharges by the voltage supplied from the DC power supply 2 through the electric motor 10 and inverter 3. For that reason, one end of the capacitor 4 is connected to the positive rail 34 of the inverter 3, while the other end of the capacitor 4 is connected to the negative rail 35 of the inverter 3. Further, when the electric motor 10 is controlled by voltage boosting control, the capacitor 4 is charged or discharged in accordance with the voltage supplied through the inverter 3. Due to this, the voltage between the positive rail 34 and negative rail 35 of the inverter 3 is boosted and the electric motor 10 driven. On the other hand, when the electric motor 10 is controlled by field weakening control, the capacitor 4 is charged and discharged so that the voltage of the capacitor 4 is maintained at a constant voltage and thereby the electric motor 10 is driven. Note that, the capacitor 4 may be made, for example, an electrolytic capacitor, a film capacitor, or a ceramic capacitor.

The voltmeter 5 measures the voltage $V_{dc}$ across the terminals of the capacitor 4. Further, the voltmeter 5 notifies that measurement voltage $V_{dc}$ to the control circuit 7. Further, the voltmeter 6 measures the power supply voltage of the DC power supply 2, that is, the voltage $V_L$ between the neutral point of the electric motor 10 and the negative rail 35 of the inverter 3. Further, the voltmeter 6 notifies that measurement voltage $V_L$ to the control circuit 7. Note that, instead of having the voltmeter 5 directly measure the voltage $V_{dc}$ across terminals of the capacitor 4, it is also possible to use a voltmeter to measure the voltage $V_H$ between the neutral point of the electric motor 10 and the different phases of terminals, that is, the neutral point of the electric motor 10 and the positive rail of the inverter 3, and have the control circuit 7 calculate the voltage $V_{dc}$ across the terminals of the capacitor 4 in accordance with the following formula:

$$V_{dc} = V_H + V_L \quad (1)$$

The control circuit 7 controls the switching devices SW1 to SW6 of the inverter 3 so as to make the electric motor 10 turn by a rotational speed instructed from another device. Further, the control circuit 7 selects either voltage boosting control or field weakening control based on the induced voltage estimated from the instructed rotational speed and the measurement voltages $V_{dc}$, $V_L$ of the voltmeters 5, 6 so as to improve the energy conversion efficiency of the electric motor 10. For that reason, the control circuit 7 has a sensor signal receiving unit 11, an interface unit 12, a control unit 13, a pulse waveform generation unit 14, and a pulse output unit 15.

The sensor signal receiving unit 11 has an interface circuit for connecting the control circuit 7 with the voltmeters 5, 6. Further, the sensor signal receiving unit 11 receives measurement voltages from the voltmeters 5, 6 and transfers the measurement voltages to the control unit 13.

The interface unit 12 has an interface circuit for connecting the control circuit 7 with another control device controlling the apparatus in which the electric motor 10 is carried, for example, a control device of a vehicle in which the electric motor 10 is carried, through a communication network. Further, the interface unit 12 transfers a control signal received through that communication network, for example, a speed instruction signal instructing the target speed of the electric motor 10, a start instruction signal instructing the start of the electric motor 10, or a stop instruction signal making the electric motor 10 stop, to the control unit 13.

The control unit 13 has one or more processors, a memory, and peripheral circuits. Further, the control unit 13 controls the switching devices SW1 to SW6 of the inverter 3 in accordance with the control signal received through the interface unit 12 so as to drive the electric motor 10. Further, the control unit 13 selects either voltage boosting control or field weakening control based on the speed designated by the speed instruction signal and the measurement voltages $V_{dc}$, $V_L$ of the voltmeters 5, 6 so as to raise the energy conversion efficiency of the electric motor 10 as much as possible. Further, the control unit 13 determines the timings of turning the switching devices SW1 to SW6 of the inverter 3 on or off in accordance with the selected control method and speed designated by the speed instruction signal so as to adjust the drive current flowing through the electric motor 10.

Figure 2:
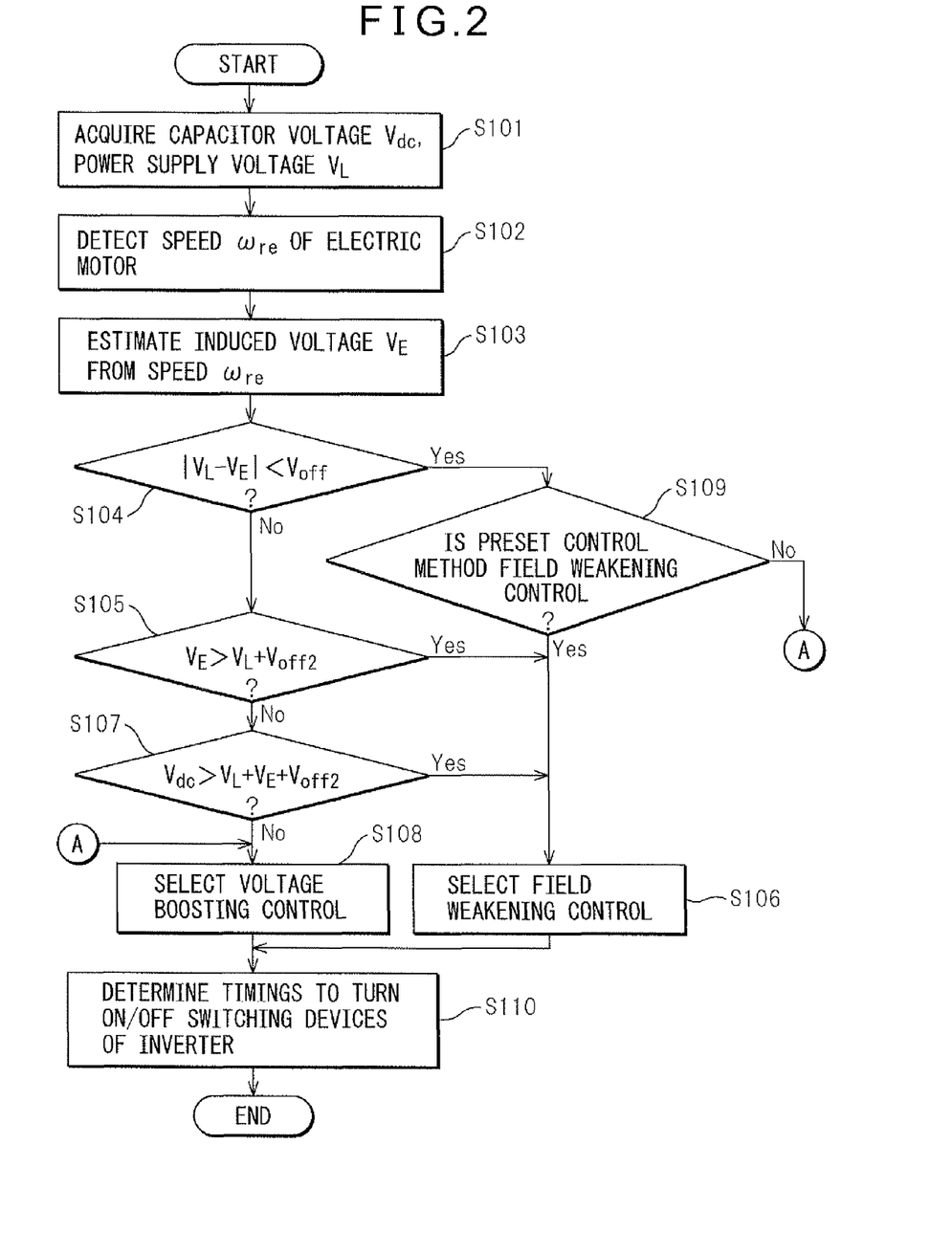
FIG. 2 is an operational flow chart of drive processing of an electric motor executed by a control circuit of the electric motor drive device.

FIG. 2 is an operational flow chart of drive processing of the electric motor executed by the control unit 13. The control unit 13 repeatedly executes the processing illustrated by this operational flow chart by a preset predetermined period. First, the control unit 13 acquires the voltage $V_{dc}$ across terminals of the capacitor and the power supply voltage $V_L$ from the voltmeters 5, 6 through the sensor signal receiving unit 11 (step S101). Further, the control unit 13 detects the mechanical angular speed $\omega_{rm}$ (rpm unit) of the electric motor 10 designated by the speed instruction signal received through the interface unit 12 (step S102).

Next, the control unit 13 estimates the induced voltage $V_E$ generated at the electric motor 10 from the mechanical angular speed $\omega_{rm}$ (step S103). For example, the control unit 13 calculates the induced voltage $V_E$ in accordance with the following formula.

$$V_E = K_E \times \omega_{re} \quad (2)$$

$$K_E \times \omega_{rm} \times p \times 2\pi/60 \text{ (rad/sec)}$$

Here, $K_E$ is an induced voltage constant which is found in advance in accordance with the configuration of the electric motor 10. Further, $\omega_{re}$ is the electrical angular speed (rad/sec unit). Furthermore, p is the number of pole pairs of the electric motor 10 (that is, the number of poles formed in the field system of the electric motor 10 divided by two).

The control unit 13 judges if the absolute value of the difference between the power supply voltage $V_L$ and the induced voltage $V_E$ is less than a predetermined value $V_{off}$ (step S104). Note that, the predetermined value $V_{off}$ is, for example, set to a value whereby the difference of the power supply voltage $V_L$ and the induced voltage $V_E$, when becoming 0 for an ideal electric motor 10, becomes the maximum value of the voltage difference occurring due to allowable manufacturing differences in the electric motor 10, that is, a value of 0 or more. When, at step S104, the absolute value of the difference between the power supply voltage $V_L$ and the induced voltage $V_E$ is the predetermined value $V_{off}$ or more, the control unit 13 judges if the induced voltage $V_E$ is the value of the power supply voltage $V_L$ plus a predetermined offset value $V_{off2}$ or more (step S105). Note that, the predetermined offset value $V_{off2}$ is, for example, determined in accordance with the characteristics of the electric motor 10 and may be either a positive value or negative value. Note that, if the electric motor 10 is an ideal electric motor free of any influences due to manufacturing variations, the offset value $V_{off2}$ is set to 0. When the induced voltage $V_E$ is $(V_L+V_{off2})$ or more, the control unit 13 selects field weakening control (step S106). In this case, even if raising the voltage $V_H$ between the positive rail 34 of the inverter 3 and the neutral point of the electric motor 10, it is not possible to make the power supply voltage $V_L$ higher than, the induced voltage $V_E$, so the balance between the voltage between the neutral point and positive rail and voltage between the neutral point and negative rail ends up being lost. For this reason, voltage fluctuation ends up being caused and the energy conversion efficiency falls. Therefore, the control unit 13 selects field weakening control.

On the other hand, when, at step S105, $V_E$ is less than $(V_L+V_{off2})$, the control unit 13 judges if the voltage $V_{dc}$ across the terminals of the capacitor is higher than the value of the induced voltage $V_E$ plus the power supply voltage $V_L$ and offset value $V_{off2}$ (step S107). If the voltage $V_{dc}$ across the terminals of the capacitor is higher than $(V_E+V_L+V_{off2})$, the control unit 13 selects field weakening control (step S106). In this case, even if the electric motor drive device 1 uses voltage boosting control, the amount of charging of the capacitor 4 will just increase. The drive force of the electric motor 10 will also not become greater and the energy conversion efficiency will fall. On the other hand, if the voltage $V_{dc}$ across the terminals of the capacitor is $(V_E+V_L+V_{off2})$ or less, the control unit 13 selects voltage boosting control (step S108). In this case, the control circuit 7 can use voltage boosting control to increase or decrease the voltage $V_{dc}$ across the terminals of the capacitor 4, that is, to increase or decrease $V_H$, so as to change the voltage substantially applied to the differences phases of coils $L_1$ to $L_3$ of the electric motor 10.

Further, when, at step S104, the absolute value of the difference of the power supply voltage $V_L$ and the induced voltage $V_E$ is less than the predetermined value $V_{off}$, that is, the induced voltage $V_E$ and the power supply voltage $V_L$ are substantially equal, the control unit 13 judges whether, for this case, the preset control method is field weakening control (step S109). Further, if the preset control method is field weakening control, the control unit 13 selects field weakening control (step S106). On the other hand, if the preset control method is not field weakening control, that is, it is voltage boosting control, the control unit 13 selects voltage boosting control (step S108). Note that, to determine in advance the control method to be applied when the induced voltage $V_E$ and the power supply voltage $V_L$ are substantially equal, for example, voltage boosting control and field weakening control are respectively applied when the power supply voltage $V_L$ is substantially equal to the induced voltage $V_E$, and the currents flowing between the different phases of terminals of the electric motor and inverter when the electric motor is driven at a predetermined speed are measured in advance. The smaller the current, the smaller the amount of energy consumption as well, so the higher the energy conversion efficiency of the electric motor. Therefore, the control giving the smaller measurement currents is determined in advance as the control method selected when the power supply voltage $V_L$, is substantially equal to the induced voltage $V_E$. Further, a memory of the control unit 13 stores in advance a flag for identifying the selected control method. At the above step S109, when the power supply voltage $V_L$ is substantially equal to the induced voltage $V_E$, the control unit 13 may refer to the flag stored in the memory and select voltage boosting control or field weakening control. Furthermore, by controlling the inverter 3 so that the power supply voltage $V_L$ becomes substantially equal to the induced voltage $V_E$ and measuring in advance the measurement current when applying voltage boosting control or field weakening control while changing the speed, the control method selected at each speed may be determined in advance. In this case, a flag set for each speed is stored in advance in the memory along with the corresponding speed. Further, at the above step S109, the control unit 13 may refer to the flag corresponding to the speed closest to the current speed among the speeds stored in the memory so as to select the voltage boosting control or field weakening control.

After step S106 or S108, the control unit 13 determines the timings of turning the switching devices SW1 to SW6 of the inverter on/off in accordance with the selected control method and speed designated by the speed instruction signal (step S110). Further, the control unit 13 outputs a voltage control signal in accordance with that timing to the pulse waveform generation unit 14 to end the control processing.

In the present embodiment, the control circuit 7 uses pulse width modulation (PWM) control to turn the switching devices SW1 to SW6 on/off. Therefore, the control unit 13 designates the timings for turning the switching devices SW1 to SW6 on/off by outputting, as voltage control signals corresponding to the phases of the electric motor 10, period signals for comparison with the carrier wave generated by the pulse waveform generation unit 14, to the pulse waveform generation unit 14. The control unit 13, for example, changes the offset value, amplitude, or period of this period signal so as to switch between voltage boosting control and field weakening control. Further, when controlling the electric motor 10 by voltage boosting control, the control unit 13, for example, changes the voltage $V_{dc}$ across the terminals of the capacitor 4 in accordance with the speed of the electric motor 10. For this reason, the control unit 13 generates voltage control signals so as to change the ratio of the time period where all of the switching devices SW1 to SW3 connected to the positive rail 34 of the inverter become off and the time period where any of the switching devices SW1 to SW3 becomes on in accordance with the targeted voltage $V_{dc}$ across the terminals of the capacitor 4. On the other hand, when controlling the electric motor 10 by field weakening control, the control unit 13 generates voltage control signals so as to maintain constant the ratio of the time period where all of the switching devices SW1 to SW3 become off and the time period where any of the switching devices SW1 to SW3 becomes on so that the voltage across the terminals of the capacitor 4 is held constant.

The pulse waveform generation unit 14, for example, uses the voltage control signals received from the control unit 13 as the basis to generate switching signals for turning the switching devices SW1 to SW6 of the inverter 3 on/off. In the above way, in the present embodiment, the control circuit 7 uses PWM control to turn the switching devices SW1 to SW6 on/off. Therefore, the pulse waveform generation unit 14 compares the voltage control signals corresponding to the different phases of the electric motor 10 received from the control unit 13 with the period signal having a predetermined period generated by an oscillation circuit (not shown) of the pulse waveform generation unit 14, that is, the carrier wave, by comparison circuits (not shown). Further, for each phase, when the voltage control signal is higher than the carrier wave, the pulse waveform generation unit 14 generates switching signals turning on the switching device connected to the positive rail 34 of the corresponding arm of the inverter 3 and turning off the switching device connected to the negative rail 35 of the corresponding arm of the inverter 3.

Figure 3A:
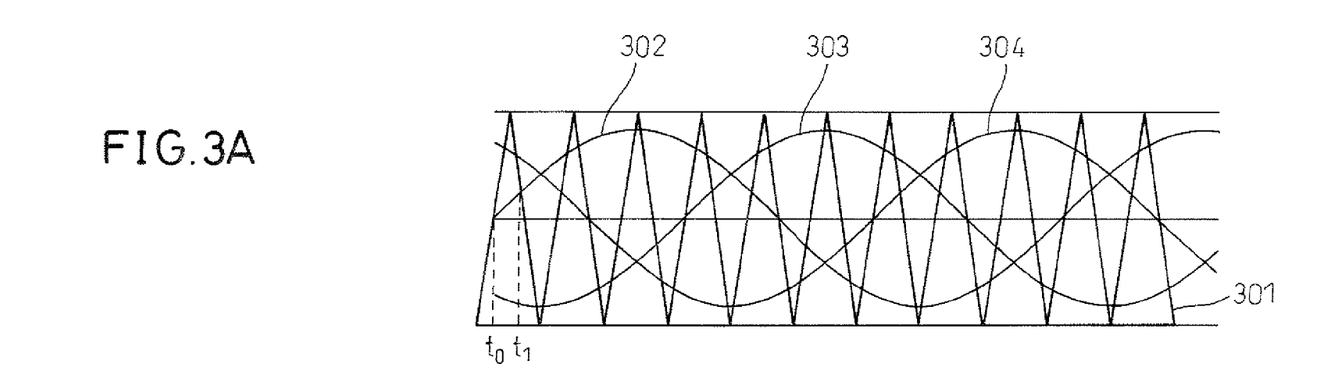
FIG. 3A is a timing chart depicting the relationship between a carrier wave and the voltage control signals for the different phases.
Figure 3B:
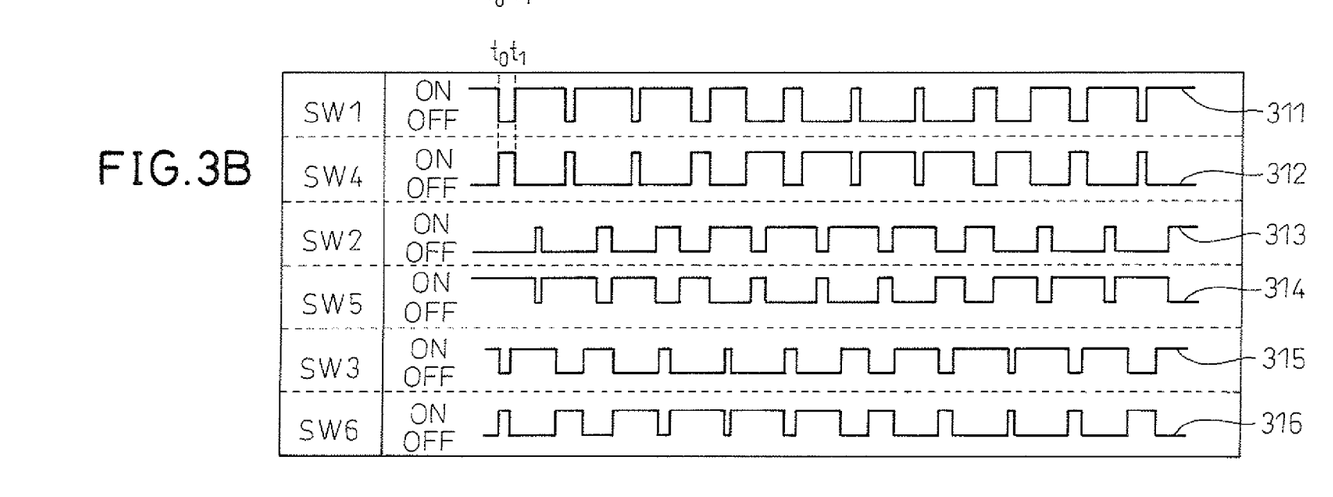
FIG. 3B is a timing chart depicting switching signals generated based on the carrier wave and voltage control signals depicted in FIG. 3A.

FIG. 3A is a timing chart depicting the carrier wave and the different phases of voltage control signals, while FIG. 3B is a timing chart depicting switching signals generated based on the carrier wave and voltage control signals shown in FIG. 3A. In FIG. 3A and FIG. 3B, the abscissa shows the time. Further, in FIG. 3A, the sawtooth wave 301 shows the carrier wave. Further, the sine waves 302 to 304 respectively show the voltage control signals for the U-phase, V-phase, and W-phase. Furthermore, in FIG. 3B, the pulse-like waves 311 to 316 show the switching signals for the switching devices shown at the left of the waves. For example, if comparing the initial triangle wave of the carrier wave 301 and the voltage control signal 302 corresponding to the U-phase, in the interval from the time $t_0$ to $t_1$, the carrier wave 301 is higher than the voltage control signal 302. For this reason, in the interval from the time $t_0$ to $t_1$, switching signals turning off the switching device SW1 connected to the positive rail 34 included in the arm 31 corresponding to the U-phase of the inverter 3 and turning on the switching device SW4 connected to the negative rail 35 are generated.

Note that, the carrier wave is not limited to a sawtooth shaped wave. The carrier wave may also be a wave of a voltage changing to repeatedly monotonously increase and monotonously decrease along with the elapse of time, for example, a sine wave. The pulse waveform generation unit 14 transfers the switching signals to the pulse output unit 15.

The pulse output unit 15 has an interface circuit for connecting the control circuit 7 and the switching devices of the inverter 3. Further, the pulse output unit 15 outputs the switching signals received from the pulse waveform generation unit 14 to the corresponding switching devices of the inverter 3. Due to this, the control circuit 7 can turn the switching devices SW1 to SW6 of the inverter 3 on/off at the desired timings. For this reason, the control circuit 7 can make the electric motor 10 turn by either voltage boosting control or field weakening control at the speed designated by the speed instruction signal.

As explained above, the electric motor drive device according to the first embodiment of the present invention uses the results of comparison of the power supply voltage connected between the neutral point of the electric motor and the negative rail of the inverter and the induced voltage as the basis to select the voltage boosting control or field weakening control which is higher in energy conversion efficiency. Due to this, this electric motor drive device does not have a boosting circuit separate from the inverter and can improve the energy conversion efficiency of the electric motor.

Figure 4:
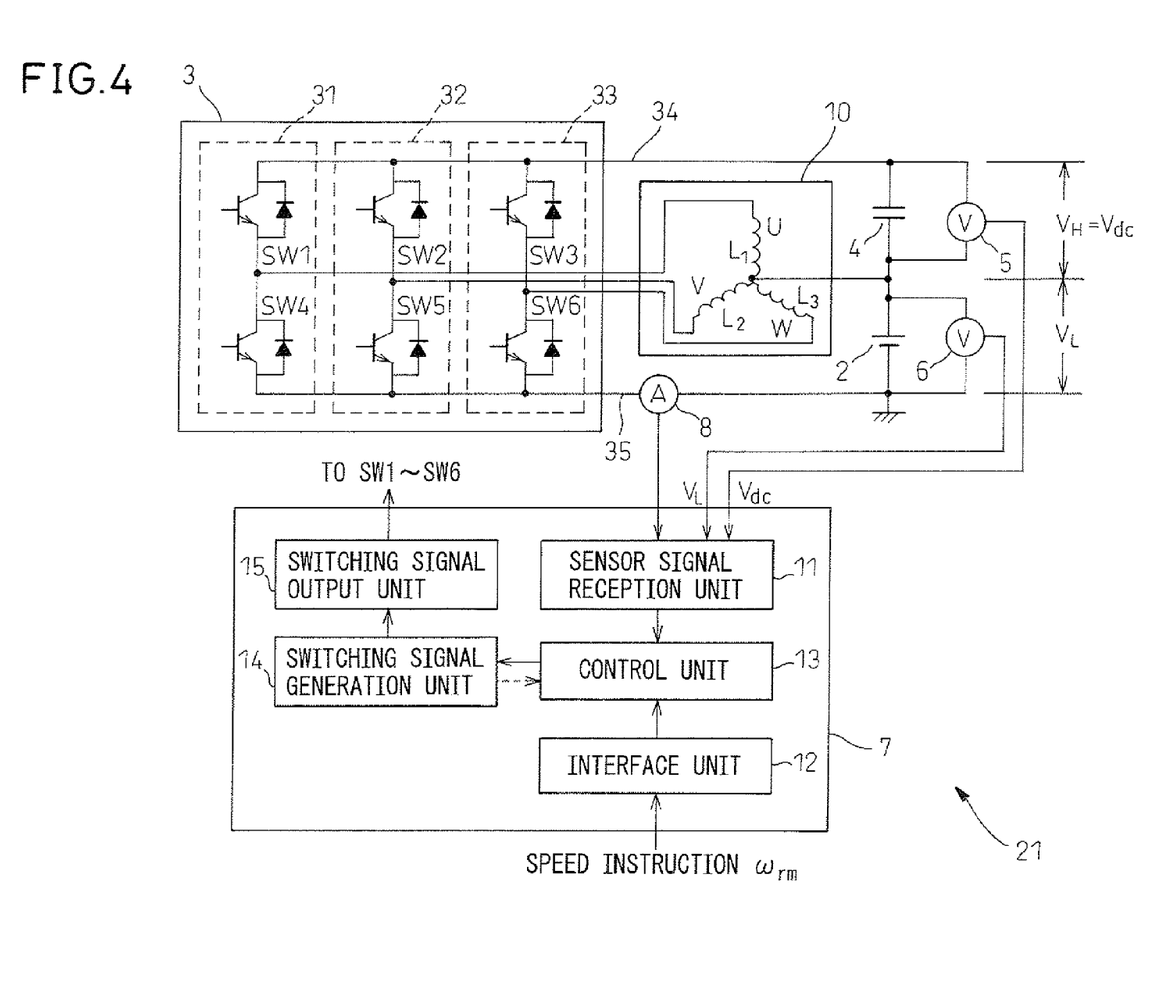
FIG. 4 is a schematic view of the configuration of an electric motor drive device according to a second embodiment of the present invention.

FIG. 4 is a schematic view of the configuration of an electric motor drive device according to a second embodiment of the present invention. As shown in FIG. 4, the electric motor drive device 21 according to the second embodiment differs from the electric motor drive device 1 according to the first embodiment in the point that one end of the capacitor 4 is connected to the neutral point of the electric motor 10 at which the different phases of coils $L_1$ to $L_3$ are connected by a star configuration, while the other end of the capacitor 4 is connected to the positive rail 34 of the inverter 3. However, in this case as well, when the electric motor 10 is controlled by voltage boosting control, the capacitor 4 is charged or discharges in accordance with the voltage between the neutral point of the electric motor 10 and the positive rail 34 of the inverter 3 so that thereby the voltage supplied to the electric motor 10 is adjusted. Note that, in FIG. 4, the components of the electric motor drive device 21 are assigned reference numerals the same as the corresponding components of the electric motor drive device 1 shown in FIG. 1.

Regarding this electric motor drive device 21 as well, the control unit 13 of the control circuit 7 controls the electric motor 10 by voltage boosting control or field weakening control in accordance with the operational flow chart shown in FIG. 2. However, in the electric motor drive device 21, the relationship of formula (1) does not stand between the voltage $V_{dc}$ across the terminals of the capacitor 4 and the voltage $V_H$ between the neutral point of the electric motor 10 and the positive rail 34 of the inverter 3. Further, $V_{dc}$ is equal to $V_H$ itself. For this reason, in the judgment processing of step S107 in the operational flow chart shown in FIG. 2, when $V_{dc}$ is larger than the induced voltage $V_E$, the processing of step S106 is executed, while if $V_{dc}$ is the induced voltage $V_E$ or less, the processing of step S108 is executed.

Figure 5:
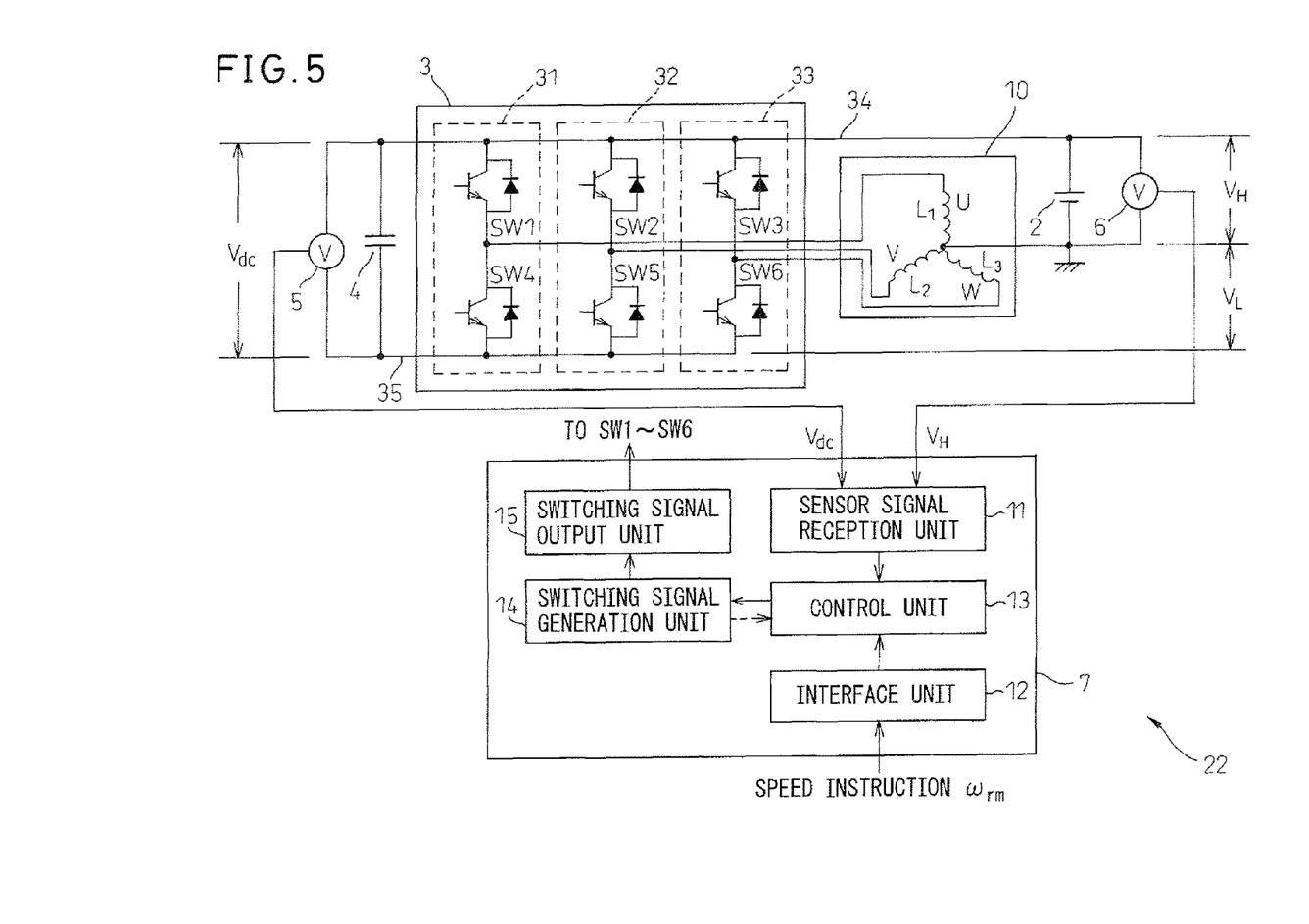
FIG. 5 is a schematic view of the configuration of an electric motor drive device according to a third embodiment of the present invention.

FIG. 5 is a schematic view of the configuration of an electric motor drive device according to a third embodiment of the present invention. As illustrated in FIG. 5, the electric motor drive device 22 according to the third embodiment differs from the electric motor drive device 1 according to the first embodiment in the point that the anode of the DC power supply 2 is connected to the positive rail 34 of the inverter 3 and the cathode of the DC power supply 2 is connected to the neutral point of the electric motor 10 at which the different phases of coils $L_1$ to $L_3$ are connected in a star configuration. Note that, in FIG. 5, the components of the electric motor drive device 22 are assigned the same reference numerals as corresponding components of the electric motor drive device 1 shown in FIG. 1.

Regarding this electric motor drive device 22 as well, the control unit 13 of the control circuit 7 controls the electric motor 10 by voltage boosting control or field weakening control in accordance with the operational flow chart shown in FIG. 2. However, in this electric motor drive device 22, the voltage $V_H$ between the neutral point of the electric motor 10 and the positive rail 34 of the inverter 3 becomes equal to the power supply voltage of the DC power supply 2. When the electric motor 10 is controlled by voltage boosting control, the voltage $V_L$ between the neutral point of the electric motor 10 and the negative rail 35 of the inverter 3 fluctuates. Further, the voltmeter 6 measures the voltage $V_H$. For this reason, the control unit 13 switches $V_L$ and $V_H$ and executes the processing of steps S104, S105, and S107 in the operational flow chart shown in FIG. 2.

Figure 6:
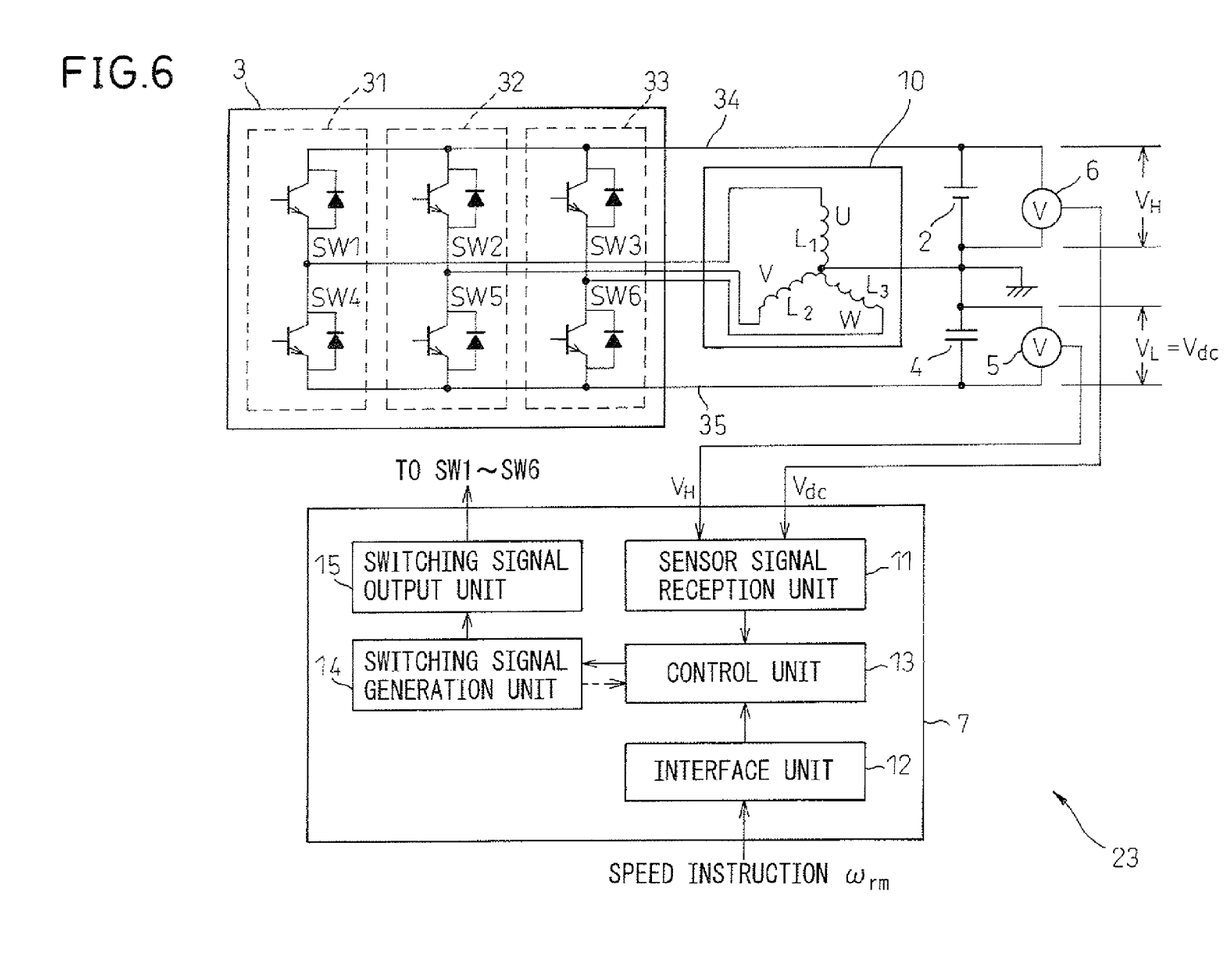
FIG. 6 is a schematic view of the configuration of an electric motor drive device according to a fourth embodiment of the present invention.

FIG. 6 is a schematic view of the configuration of an electric motor drive device according to a fourth embodiment of the present invention. As illustrated in FIG. 6, the electric motor drive device 23 according to the fourth embodiment differs from the electric motor drive device 22 according to the third embodiment in the points that one end of the capacitor 4 is connected to the neutral point of the electric motor 10 at which the different phases of coils $L_1$ to $L_3$ are connected in a star configuration and that the other end of the capacitor 4 is connected to the negative rail 35 of the inverter 3. However, in this case as well, when the electric motor 10 is controlled by voltage boosting control, the capacitor 4 is charged or discharges in accordance with the voltage between the neutral point of the electric motor 10 and the negative rail 35 of the inverter 3 so as to thereby adjust the voltage supplied to the electric motor 10. Note that, in FIG. 6, the components of the electric motor drive device 23 are assigned the same reference numerals as corresponding components of the electric motor drive device 22 shown in FIG. 5.

Regarding this electric motor drive device 23 as well, the control unit 13 of the control circuit 7 controls the electric motor 10 by voltage boosting control or field weakening control in accordance with the operational flow chart shown in FIG. 2. However, in the electric motor drive device 23, the voltage $V_{dc}$ across the terminals of the capacitor 4 and the voltage $V_L$ between the neutral point of the electric motor 10 and the negative rail 35 of the inverter 3 are equal. For this reason, in the judgment processing of step S107 of the operational flow chart shown in FIG. 2, if $V_{dc}$ is larger than the induced voltage $V_E$, the processing of step S106 is executed, while if $V_{dc}$ is the induced voltage $V_E$ or less, the processing of step S108 is executed. Further, the power supply voltage is $V_H$, so the control unit 13 switches $V_L$ and $V_H$ and executes the processings of steps S104 and S105 of the operational flow chart shown in FIG. 2.

Note that, in the above embodiments, when the effect of manufacturing differences in the electric motor etc. on the estimated value of the induced voltage is small, the processings of step S104 and S109 may also be omitted. In this case, the offset value $V_{off}$ may also be set to 0. Further, when the drop in the energy conversion efficiency due to the difference of the voltage across the terminals of the capacitor minus the total of the power supply voltage and induced voltage is small, the processing of step S107 may also be omitted.

Further, in the above embodiments, a reference table showing the relationship between the speed of the electric motor designated by the speed instruction signal (mechanical angular speed $\omega_{rm}$) and the induced voltage corresponding to that speed may be prepared in advance for example in accordance with results of measurement or results of simulation. Further, that reference table may be stored in advance in a memory of the control unit 13 of the control circuit 7. In this case, the control unit 13 can refer to the reference table and estimate the induced voltage corresponding to the mechanical angular speed of the electric motor designated by the speed instruction signal. Due to this, even when manufacturing differences etc. of the electric motor 10 mean that the speed of the electric motor designated by the speed instruction signal and the actually generated induced voltage do not satisfy the relationship of formula (2), it is possible to accurately estimate the induced voltage.

Further, in the above embodiments, rather than measuring the $V_L$ or $V_H$ corresponding to the supplied voltage of the DC power supply, the electric motor drive device may also use standard values of supplied voltage of the DC power supply as $V_L$ or $V_H$. In this case, in the electric motor drive device, the voltmeters for measuring $V_L$ or $V_H$ may also be omitted. Alternatively, in the above embodiments, rather than measuring $V_L$ or $V_H$, the electric motor drive device may also estimate $V_L$ or $V_H$ from the voltage $V_{dc}$ across the terminals of the capacitor 4 and the switching signal output from the control circuit 7 to the inverter 3. For example, in the first embodiment, during one period of the switching signal, the total of the time periods when the bottom switching devices SW4 to SW6 connected to the negative rail 35 of the inverter 3 are on is defined as $T_{ON}$ and the total of the time periods when the bottom switching devices SW4 to SW6 are off is defined as $T_{OFF}$. The capacitor 4 is charged through that bottom switching devices and the corresponding top switching devices during the time period where the bottom switching devices are off, so there is the following relation between $V_{dc}$ and $V_L$.

$$V_{dc} = \frac{T_{ON} + T_{OFF}}{T_{OFF}} V_L \qquad (3)$$

Therefore, the control unit 13 can acquire the switching signals from the pulse waveform generation unit 14, find the time periods $T_{ON}$ and $T_{OFF}$ from the switching signals, and enter into formula (3) these time periods and the speed designated by the speed instruction signal and the measurement voltage $V_{dc}$ so as to estimate the $V_L$. Alternatively, by entering the measured values of $V_L$ or $V_H$ or the prescribed value of the power supply voltage corresponding to $V_L$ or $V_H$ into the formula (3), the control unit 13 can estimate the voltage $V_{dc}$ across the terminals of the capacitor 4. In this case, the voltmeter for measuring the voltage $V_{dc}$ across the terminals of the capacitor 4 may be omitted.

Furthermore, the control unit 13 may also use a parameter defining the voltage control signals instead of the time periods $T_{on}$ and $T_{off}$ to estimate $V_L$ and $V_H$. In the above, the switching signals are determined by the result of comparison of the carrier wave generated by the pulse waveform generation unit 14 and the voltage control signals. For this reason, if the carrier wave is fixed, the time periods $T_{on}$ and $T_{off}$ are also unambiguously determined in accordance with the voltage control signals. That is, the control unit 13 can use parameters defining the voltage control signals instead of the time periods $T_{on}$ and $T_{off}$ to estimate $V_L$ and $V_H$. For example, for the first embodiment, the control unit 13 can calculate $V_L$ by the following formula where the magnitude of the voltage vector corresponding to the voltage control signal for each phase is made "V":

$$V_L = A \times (V_{dc} - V)$$

where, A is a correction coefficient. Further, the voltage vector can be made the effective value or wave height value of the voltage control signals if, for example, the period and amplitude of the voltage control signals are determined.

Further, the electric motor drive device may measure the current flowing through the electric motor during the drive operation of the electric motor and use that measurement current as a basis or use that measurement current and the $V_{dc}$ or other measurement voltage as the basis for selection of the control method used. In this case, for example, to measure the current flowing through the electric motor, an ammeter is provided at either the positive rail 34 or negative rail 35 of the inverter 3 which is connected to one pole of the DC power supply 2. For example, if referring to FIG. 4 again, the ammeter 8 is provided at the negative rail 35. Further, the ammeter 8 notifies the measured value of the current to the control circuit 7. The control unit 13 of the control circuit 7 acquires the current value measured by the ammeter 8 through the sensor signal receiving unit 11. If the power supply voltage is substantially equal to the induced voltage $V_E$ (in operational flow chart shown in FIG. 2, step S104—Yes), the control unit 13 selects field weakening control if the measured current value is larger than a preset predetermined value while selects voltage boosting control if the measured current value is that predetermined value or less. Note that, this predetermined value is, for example, set to the lower limit value where the energy conversion efficiency when field weakening control is applied becomes higher than the energy conversion efficiency when voltage boosting control is applied. Furthermore, regardless of the relationship of $V_L$ and $V_H$ and the induced voltage $V_E$, the control unit 13 selects field weakening control if the measured current value is larger than a preset predetermined value, while selects voltage boosting control if the measured current value is that predetermined value or less. In this way, by the control unit using the value of the current flowing through the electric motor to determine the control method of the electric motor, the control unit can select the optimal control method in real time.

Furthermore, in the above embodiments, the control unit may correct the estimated value of the induced voltage in accordance with status signals showing the operating environment of the electric motor. Note that, as a status signal expressing the operating environment, for example, the inside temperature of the electric motor acquired by a temperature sensor set inside the electric motor or the temperature around the electric motor or the thermistor temperature of the inverter acquired by a temperature sensor detecting the temperature around the electric motor or of the thermistor of the inverter may be used. Further, as another example of the status signal, the temperature acquired by a temperature sensor installed inside or around the apparatus in which the electric motor is assembled, for example, the inside temperature of an air-conditioning system in which the electric motor is housed or the outside air temperature acquired by an outside air temperature sensor installed near the engine compartment in which the electric motor is provided may be used. In this case, the interface unit of the control circuit has the function as a status signal acquiring unit, for example, acquires temperature information as the status signal from the air-conditioning system or outside air temperature sensor and transfers that status signal to the control unit.

To determine the correction value, for any of the above status signals or combination of status signals, the mechanical angular speed of the electric motor, the voltage $V_{dc}$ across the terminals of the capacitor, the power supply voltage, and the value of the current flowing through the electric motor are measured in advance for various status signal values so as to find the induced voltage for the combinations of status signal values and mechanical angular speed of the electric motor. Further, the difference of the induced voltage calculated by formula (1) from the measured value is made the correction value. Further, the found correction value is made an indicator utilized for estimation of the induced voltage and a map linking the indicator values and the combinations of status signal values and mechanical angular speed of the electric motor is prepared. That map is stored in advance in the memory of the control unit. When estimating the induced voltage during a drive operation of the electric motor, the control unit acquires the mechanical angular speed designated by the speed instruction signal of the electric motor and the status signal value. Further, the control unit refers to the map stored in the memory so as to determine the indicator value corresponding to that mechanical angular speed and status signal value, that is, correction value. Further, the control unit adds that correction value to the induced voltage calculated by formula (1) to thereby find the estimated value of the induced voltage. Alternatively, it may use induced voltages measured for combinations of the status signal values and mechanical angular speeds of the electric motor themselves as indicator values and have those indicator values stored in a map. In this case, when estimating the induced voltage during drive operation of the electric motor, the control unit refers to the map stored in the memory and thereby uses the value of the induced voltage corresponding to the mechanical angular speed and status signal value of the electric motor as the estimated value of the induced voltage.

Furthermore, by applying for example the least square method to the measured values of the induced voltage for a combination of the status signal values and mechanical angular speed of the electric motor, a function expressing the relationship of the combination of the status signal values and the mechanical angular speed of the electric motor with the induced voltage may be determined in advance. In this case, when estimating the induced voltage during drive of the electric motor, the control unit determines the induced voltage by inputting the mechanical angular speed of the electric motor shown by the speed instruction signal and the status signal value into the above function.

Further, the above embodiments, the control circuit estimates the induced voltage from the speed instruction signal, but the control circuit may also calculate the induced voltage from the voltage instruction for driving the electric motor.

Note that, the voltage instruction for driving the electric motor expresses the sum of the induced voltage and the potential difference generated from the resistance of the electric motor and impedance due to the coils. Therefore, the control circuit may use the measured value of the current flowing through the electric motor or the speed of the electric motor calculated from the speed instruction signal or speed of the electric motor obtained from the speed sensor as the basis to calculate the potential difference generated due to the impedance. Further, the control circuit can subtract the potential difference generated from the impedance from the voltage value expressed in the voltage instruction so as to find the induced voltage. Further, the potential difference generated from the impedance is extremely small. For this reason, the control circuit may ignore the potential difference arising due to the impedance as error and use the voltage expressed by the voltage instruction itself as the induced voltage.

Further, in the above embodiments, the control circuit may execute the processing of steps S104 to S108 in the operational flow chart of FIG. 2 and therefore select either of the control methods only when the induced voltage $V_E$ is larger than $V_L$ or $V_H$ and may drive the electric motor in accordance with a control method applied in the past in other cases. Due to this, the control circuit can lighten the processing load required for selecting voltage boosting control or field weakening control.

Figure 7:
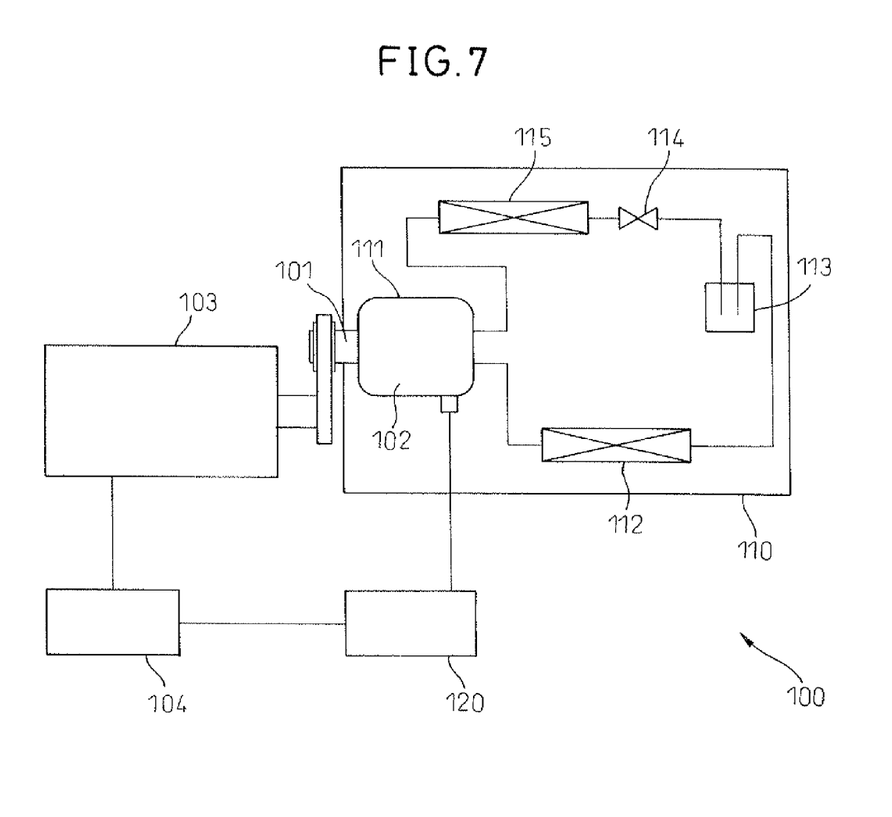
FIG. 7 is a schematic view of the configuration of a vehicular air-conditioning system having an electric compressor driven by an electric motor controlled by an electric motor drive device according to any of the embodiments of the present invention.

The electric motor drive devices according to the above embodiments or their modifications and electric motors controlled by those electric motor drive devices can be utilized for various apparatuses, such as compressors, blower fans, and other fan devices of air-conditioning systems, oil pumps used for circulation of cooling water, and drive sources or steering apparatuses of vehicles. FIG. 7 is a schematic view of the configuration of a vehicular air-conditioning system having an electric compressor driven by an electric motor controlled by an electric motor drive device according to any of the embodiments of the present invention. The vehicular air-conditioning system 100 has a heat pump circuit 110 and a control device 120. The heat pump circuit 110 has an electric compressor 111, condenser 112, receiver 113, expansion valve 114, and evaporator 115.

The electric compressor 111 may, for example, be made a variable capacity type compressor having a shaft 101, a compression unit 102 to which the shaft 101 is rotatably attached, an electric motor 103, and an electric motor drive device 104. The electric compressor 111 transmits the power of the electric motor 103 through a belt or pulley to the shaft 101 so as to make the shaft 101 turn. Further, by a cylinder (not shown) attached to the shaft 101 via a swash plate (not shown) moving in the compression unit 102, the refrigerant supplied into the compression unit 102 is compressed and becomes high pressure gas. Further, this compression unit 102 is an operating unit which performs predetermined work by using the power from the electric motor 103. The electric motor 103 is a multi-phase AC electric motor. In the same way as the AC electric motors of the above embodiments, the coils of the different phases are connected in a star configuration. Further, between the neutral point of the electric motor 103 and the positive rail or negative rail of the inverter of the electric motor drive device 104, DC electric power from a DC power supply (not shown) is supplied, whereby the electric motor 103 turns by that DC electric power. Note that, the DC power supply, for example, may be made a battery carried in a vehicle or a power supply circuit converting voltage supplied from a battery to a predetermined voltage and outputting the converted voltage. The electric motor drive device 104 is an electric motor drive device of any of the above embodiments.

Further, the electric motor drive device 104 selects either voltage boosting control or field weakening control based on the induced voltage generated at the electric motor 103 and the voltage across the terminals of the capacitor of the electric motor drive device 104 and drives the electric motor 103 in accordance with the selected control method.

The condenser 112 cools the high temperature, high pressure refrigerant gas sent from the electric compressor 111 and causes it to liquefy. The receiver 113 stores the liquefied refrigerant gas. Further, the receiver 113 prevents a drop in cooling performance by removing the gas bubbles contained in the liquefied refrigerant and sending only completely liquefied refrigerant to the expansion valve 114. The expansion valve 114 causes the liquefied refrigerant to expand by adiabatic expansion to lower the temperature and lower the pressure and sends the result to the evaporator 115. The evaporator 115 performs heat exchange between the low temperature, low pressure refrigerant and the air blown into the evaporator 115 by a blower fan (not shown) etc. to cool that air. The cooled air is blown out into the cabin and air-conditions the cabin. On the other hand, the refrigerant warmed by heat exchange at the evaporator 115 again flows into the electric compressor 111.

In the same way as the electric compressor 111, the blower fan is also a device driven by the AC electric motor. The blower fan transmits the drive power supplied by the AC electric motor through a direct drive connecting shaft to the operating part, that is, the fan, so as to make the fan turn. In this blower fan as well, by using the electric motor drive device according to any of the embodiments of the present invention to control the AC electric motor, it becomes possible to drive the electric motor with a good energy conversion efficiency.

The control device (hereinafter referred to as the "air-conditioning ECU") 120 is comprised of a built-in type microprocessor, memory, communication circuit, and its peripheral circuits. Further, the air-conditioning ECU 120 controls the parts of the air-conditioning system 100 in accordance with a program operating on the microprocessor, target room temperature, cabin inside air temperature, etc. Further, the air-conditioning ECU 120 can communicate through a control area network (CAN) or other such car mounted network with an electric motor drive device 104 according to any of the above embodiments for controlling the electric motor 103. Further, the air-conditioning ECU 120 determines the speed of the electric motor 103 (mechanical angular speed) in accordance with the target room temperature and cabin inside air temperature. Further, the air-conditioning ECU 120 notifies that speed to the electric motor drive device 104.

In the above way, a person skilled in the art could make various changes to the embodiments within the scope of the present invention.

What is claimed is:

1. An electric motor drive device driving an AC electric motor including a plurality of coils connected in a star configuration, comprising an inverter including a plurality of arms, each of the plurality of arms corresponding to any one of the plurality of coils of the AC electric motor and including a first switching device connected to a positive rail and a second switching device connected in series between the first switching device and a negative rail, wherein, for each of the plurality of arms, the midpoint of the first switching device and second switching device is connected with one end of the corresponding coil of the AC electric motor;

a capacitor charged by a current supplied from a DC power supply supplying DC voltage between a neutral point at which the other ends of the coils of the AC electric motor are connected and a positive rail or negative rail of the inverter and passing through the inverter; and a control circuit controlling the switching devices of the inverter so that the AC electric motor rotates at a designated speed, wherein said control circuit uses field weakening control, which lowers the induced voltage to control the switching devices of the inverter, when the induced voltage generated at the AC electric motor is larger than the power supply voltage supplied by the DC power supply and, on the other hand, uses voltage boosting control, which changes the amount of charging of the capacitor so as to change the voltage applied to the AC electric motor to control the switching devices of the inverter, when the induced voltage is smaller than the power supply voltage.

2. An electric motor drive device as set forth in claim 1, wherein said control circuit uses predetermined control among said field weakening control and said voltage boosting control so as to control said switching devices of the inverter when a difference of said power supply voltage and said induced voltage is within a predetermined range.

3. An electric motor drive device as set forth in claim 1, wherein
said device further comprises an ammeter measuring a current flowing through said AC electric motor, and,
when the difference of said power supply voltage and said induced voltage is within a predetermined range, said control circuit uses said field weakening control to control the switching devices of the inverter if the value of the current is higher than a predetermined value and uses said voltage boosting control to control the switching devices of the inverter if the value of the current is said predetermined value or less.

4. An electric motor drive device as set forth in claim 1, wherein when said induced voltage is smaller than said power supply voltage, said control circuit uses said field weakening control to control the switching devices of the inverter if a total of said power supply voltage and said induced voltage is lower than the voltage across the terminals of said capacitor.

5. An electric motor drive device as set forth in claim 4, wherein said control circuit estimates said power supply voltage by dividing the voltage across the terminals of said capacitor by a ratio of a time period during which current flows from said inverter to said capacity in one period of a switching signal for control of the switching devices of said inverter.

6. An electric motor drive device as set forth in claim 1, wherein
said device further comprises a status signal acquiring unit which acquires a status signal expressing a state of an operating environment of said AC electric motor, and wherein
said control circuit uses values corresponding to the status signal and designated speed among the values giving a predetermined indicator of induced voltage for a combination of the status signal and speed so as to estimate the induced voltage.

7. An electrically driven device comprising:
an AC electric motor including a plurality of coils connected in a star configuration,
an electric motor drive device as set forth in claim 1 which controls said AC electric motor, and
an operating unit performing predetermined work using power supplied from said AC electric motor.

8. A control method of an electric motor drive device driving an AC electric motor including a plurality of coils connected in a star configuration,
said electric motor drive device including
an inverter including a plurality of arms, each of the plurality of arms corresponding to any one of the plurality of coils of the AC electric motor and including a first switching device connected to a positive rail and a second switching device connected in series between the first switching device and a negative rail, wherein for each of the plurality of arms, the midpoint of the first switching device and second switching device is connected with one end of the corresponding coil of the AC electric motor and
a capacitor charged by a current supplied from a DC power supply supplying DC voltage between a neutral point to which the other ends of the coils of the AC electric motor are connected and a positive rail or negative rail of the inverter and passing through the inverter;
said control method comprising:
comparing the induced voltage generated at said AC electric motor with the power supply voltage supplied by said DC power supply and
using field weakening control, which lowers the induced voltage to control the switching devices of the inverter so that the AC electric motor rotates at a designated speed, when the induced voltage generated at the AC electric motor is larger than the power supply voltage supplied by the DC power supply and, on the other hand, using voltage boosting control, which changes the amount of charging of the capacitor so as to change the voltage applied to the AC electric motor to control the switching devices of the inverter, when the induced voltage is smaller than the power supply voltage.

* * * * *